UNITED STATES PATENT OFFICE.

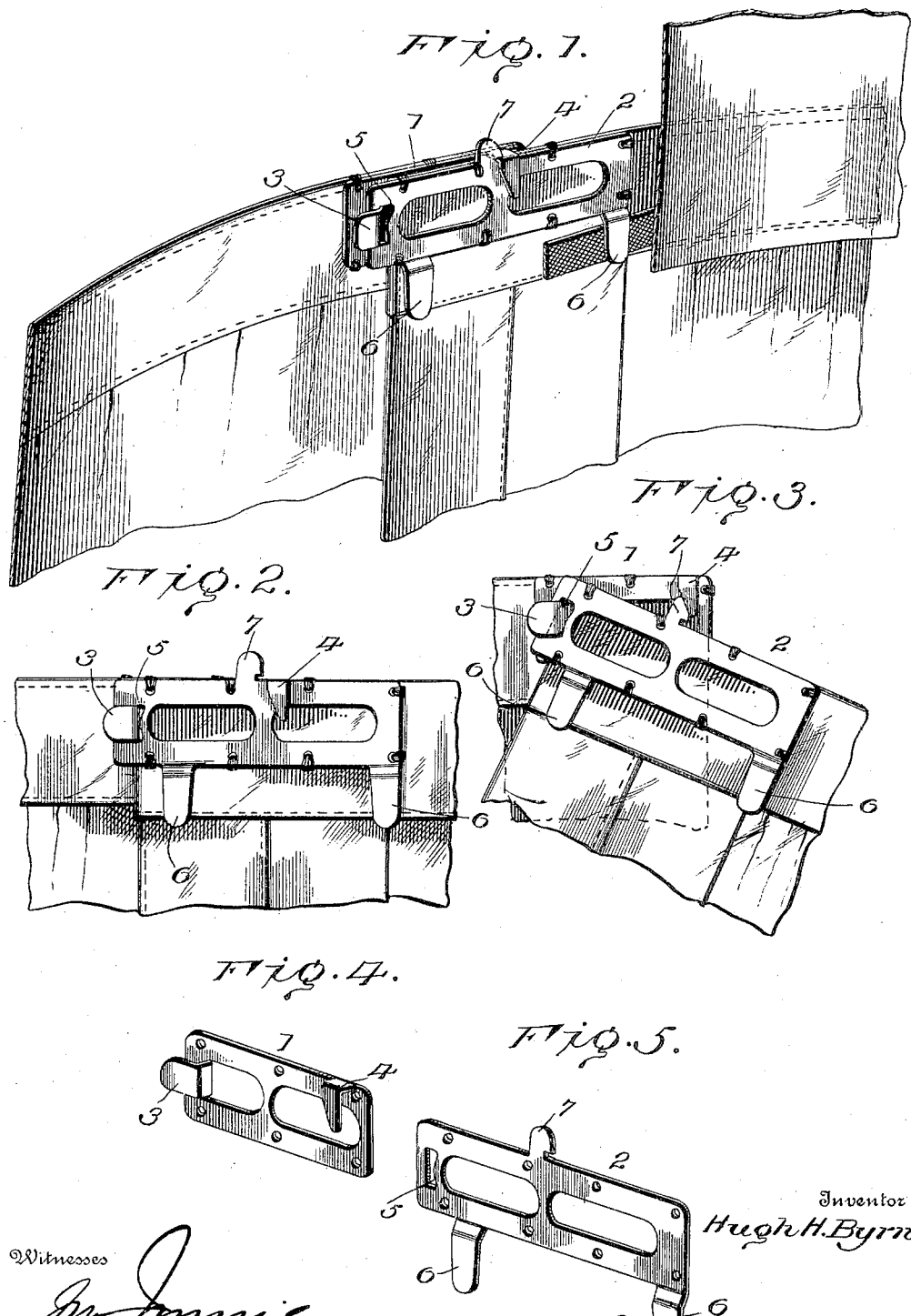

HUGH H. BYRNE, OF LA CROSSE, WISCONSIN.

GARMENT SUPPORT AND FASTENER.

SPECIFICATION forming part of Letters Patent No. 684,744, dated October 15, 1901.

Application filed February 8, 1901. Serial No. 46,562. (No model.)

*To all whom it may concern:*

Be it known that I, HUGH H. BYRNE, a citizen of the United States, residing at La Crosse, in the county of La Crosse and State of Wisconsin, have invented certain new and useful Improvements in Garment Supports and Fasteners; and I do hereby declare the following to be a full, clear, and exact description of the invention, such as will enable others skilled in the art to which it appertains to make and use the same.

It is desirable in devices of this character to have the fastening of minimum size and secure against opening casually. Hence a catch and stop are provided to lock the parts of the fastening when coupled.

The invention will be more particularly set forth hereinafter and claimed, and is illustrated in the drawings hereto annexed, in which—

Figure 1 is a perspective view of the fastener, showing the parts connected and locked. Fig. 2 is an elevation showing the parts moved to effect an unlocking thereof. Fig. 3 is a view similar to Fig. 2, showing the parts turned to admit of their unclasping. Fig. 4 is a perspective view of one member of the fastener. Fig. 5 is a similar view of the other member.

Corresponding and like parts are referred to in the following description and indicated in all the views of the drawings by the same reference characters.

The fastener is composed of two parts or members 1 and 2, designated, respectively, as the "hook" member and the "eye" member. The hook member 1 is considerably shorter than the eye member 2 and is provided at one end with the engaging hook 3 and at its opposite end with a keeper 4, arranged at the upper outer corner and having its inner edge inclined. The engaging hook 3 and keeper 4 project from the same side of the member, and both are of hook form and are integral with said member.

The eye member 2 is provided at one end with an opening or slot 5, constituting the eye to receive the engaging hook 3, and hooks 6 are pendent from its lower edge at opposite ends. These hooks are designed to engage with eyes, a tape, or other engaging means of the waist to prevent upward creeping thereof and also to serve as supporting means for the skirt. A catch 7 is provided at the top edge of the member 2 intermediate of its ends and is adapted to coöperate with the keeper 4 and interlock therewith to secure the members of the fastener when coupled or engaged. This catch 7 consists of a vertical extension having a notch in one edge to interlock with the horizontal portion of the keeper 4, thereby preventing relative turning of the members upon each other when coupled and under tension. The member 2 is confined between the member 1 and the vertical portion of the keeper 4. Hence lateral displacement of the members is prevented. Each of the members is provided adjacent to its edges with openings to receive the stitching, by means of which they are secured to the waistband or other portion of the garment to which the fastener is applied.

The members have portions cut therefrom for the sake of lightness and flexibility and are preferably stamped from sheet metal, although they may be constructed in any economical way. When engaging the parts of the fastener, the members are brought together and the engaging hook 3 is passed through the opening or eye 5, after which the separated ends are moved inward and turned so as to cause the keeper 4 to engage over the top edge of the member 2, when the members are moved outward to effect interlocking engagement of the catch 7 with the keeper, thereby preventing casual loosening or disengagement of the parts. When it is required to uncouple the fastener, the parts 1 and 2 are moved inward, as shown in Fig. 2, to disengage the catch from the keeper, after which the parts are turned to the position substantially as shown in Fig. 3 to enable the member 2 to clear the keeper 4, when the parts can be unclasped in the usual way.

Within the purview of the invention various changes in the form, proportion, and minor details of construction may be resorted to without departing from the spirit of the invention, which resides in the features specially noted in the appended claims.

Having thus described the invention, what is claimed as new is—

1. A garment-fastening comprising coöperating parts or members adapted to overlap and having engaging means at one end of the overlapped portions, a keeper applied to one of the parts near the opposite end of the overlapped portions for engagement with the other part to prevent lateral separation of the said parts, and a catch provided on the other part for coöperation with the said keeper by a longitudinal movement of the overlapped portions to prevent turning of the members and casual disengagement thereof when clasped, substantially as set forth.

2. The herein-described garment fastener and supporter, consisting of a member or part having a terminal engaging hook and a terminal keeper, a second member or part having a terminal eye to receive the engaging hook, pendent hooks at its lower edge, and a catch at its top edge intermediate of its ends for coöperation with the keeper of the first-mentioned member, substantially as and for the purpose set forth.

In testimony whereof I affix my signature in presence of two witnesses.

HUGH H. BYRNE. [L. S.]

Witnesses:
JNO. B. WEBBER,
C. L. BALDWIN.